July 14, 1925.
R. H. McELROY
1,546,297
THRUST BEARING OILING DEVICE
Original Filed July 13, 1922
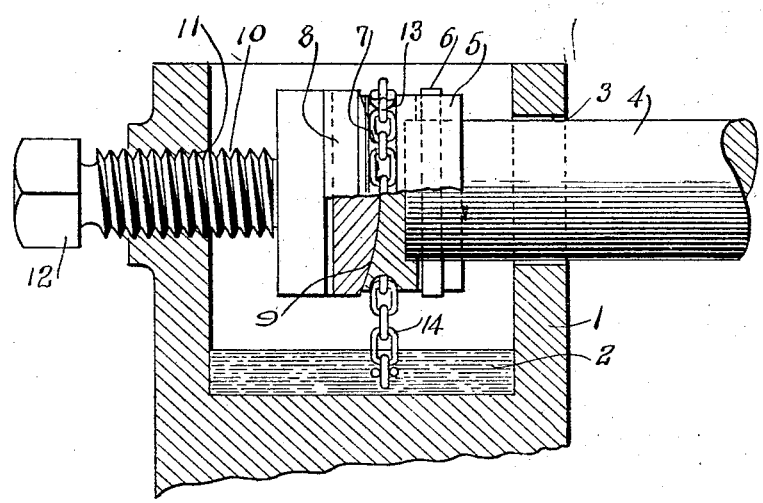
Inventor
Roy H. McElroy,
By Toulmin & Toulmin,
Attorneys Patented July 14, 1925.

1,546,297

UNITED STATES PATENT OFFICE.

ROY H. McELROY, OF DAYTON, OHIO, ASSIGNOR TO R. H. McELROY, RECEIVER FOR THE BOHMANN IRON WORKS COMPANY, OF DAYTON, OHIO.

THRUST-BEARING-OILING DEVICE.

Original application filed July 13, 1922, Serial No. 574,682. Divided and this application filed May 22, 1923. Serial No. 640,787.

*To all whom it may concern:*

Be it known that I, ROY H. McELROY, a citizen of the United States, residing at Dayton, in the county of Montgomery and State of Ohio, have invented certain new and useful Improvements in Thrust-Bearing-Oiling Devices, of which the following is a specification, reference being had therein to the accompanying drawing.

My invention relates to bearings and means of oiling such bearings.

It is the object of my invention to provide a means of oiling a thrust bearing to utilize all of the oil in the housing for the bearing, without permitting oil to escape through the junction point between the casing and the shaft.

It is my further object to provide a means of oiling the bearing that will use the oil rather than waste it, as has been the case heretofore, where it has been necessary to run the bearing in oil, with consequent loss of it along the shaft.

It is my further object to provide a bearing which is adjustable for wear and thrust.

This application is a division of my copending application Serial Number 574,682, filed July 13, 1922.

Referring to the drawing:

The figure is a section through a reservoir, disclosing the shaft bearing and oiling device.

Referring to the drawing in detail:

1 is a casing adapted to contain a quantity of lubricant designated 2.

In one wall of this casing there is an aperture 3 for the reception of a shaft 4, which is subjected to thrusts from machines to which it may be connected, such as clay-working machines.

Mounted upon the end of this shaft 4 is a head 5 retained thereon by a pin 6.

The end 5 is concave as at 7, thus constituting a sphero-concave bearing member carried by the end of the shaft 4. This sphero-concave bearing member engages a sphero-convex bearing member 8, which has a convex surface 9. This sphero-convex bearing member 8 is connected to a screw 10, which is threaded in the outer wall of the reservoir 1 as at 11. This screw is adapted to be actuated by a head 12.

The sphero-concave bearing member is provided on its outward surface, closely adjacent the point of junction with the sphero-convex member, with a groove 13, in which there travels an endless oiling chain 14. This chain is continuously dipping in the oil 2, which it thus carries up and over the bearing members, lubricating them and preventing excessive wear.

It will be apparent that the bearings may be adjusted for thrust and wear, and that the oil may be maintained at a minimum and still be fully utilized without waste.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

In a device of the kind described, an oil reservoir having a threaded opening in the one wall and a shaft receiving opening in the opposite wall, an adjusting screw extending through said threaded opening, a bearing member having one surface resting against the end of said screw and its opposite surface of sphero-convex form, a shaft extending through the shaft opening, a second bearing member provided with an annular groove and having a recess receiving the end of said shaft, said second bearing member having a sphero-concave face fitting the sphero-convex face of the first member, and an endless chain suspended from the second member in said groove, said groove being located closely adjacent to the junction between the bearing members.

In testimony whereof, I affix my signature.

ROY H. McELROY.